United States Patent [19]

Hida

[11] Patent Number: 5,213,730

[45] Date of Patent: * May 25, 1993

[54] CONTROLLED COMBUSTION SYNTHESIS PROCESS FOR THE PRODUCTION OF SILICIDE BASED COMPOSITES

[75] Inventor: George T. Hida, North Tonawanda

[73] Assignee: Benchmark Structural Ceramics Corporation, Amherst, N.Y.

[*] Notice: The portion of the term of this patent subsequent to Apr. 30, 2008 has been disclaimed.

[21] Appl. No.: 691,139

[22] Filed: Apr. 25, 1991

Related U.S. Application Data

[63] Continuation-in-part of Ser. No. 254,175, Oct. 6, 1988, Pat. No. 5,006,290, and a continuation-in-part of Ser. No. 499,038, Mar. 26, 1990, Pat. No. 5,011,800.

[51] Int. Cl.$^5$ ............................................. C04B 35/64
[52] U.S. Cl. ...................................... 264/63; 264/65; 264/80; 501/96; 501/98
[58] Field of Search ............... 264/65, 63, 80; 501/96, 501/98

[56] References Cited

U.S. PATENT DOCUMENTS

| | | | |
|---|---|---|---|
| 4,902,457 | 2/1990 | Wada | 264/60 |
| 5,006,290 | 4/1991 | Hida | 264/65 |
| 5,011,800 | 4/1991 | Abramovici | 501/96 |

*Primary Examiner*—James Derrington
*Attorney, Agent, or Firm*—Howard J. Greenwald

[57] ABSTRACT

There is disclosed a process in which a transition metal compound is mixed with silica until a specified density of intimate contact points is produced in the mixture. To this mixture is then added a reducing agent. Thereafter, a reinforcing agent is intimately dispersed throughout the mixture, the mixture is formed into a green body, and it then is ignited.

18 Claims, 1 Drawing Sheet

CONTROLLED COMBUSTION SYNTHESIS PROCESS FOR THE PRODUCTION OF SILICIDE BASED COMPOSITES

CROSS-REFERENCE TO RELATED PATENT APPLICATIONS

This is a continuation-in-part of applicant's copending application U.S. Ser. No. 07/254,175, filed on Oct. 6, 1988, now U.S. Pat. No. 5,006,290, and also of copending application U.S. Ser. No. 07/499,038, filed Mar. 26, 1990, now U.S. Pat. No. 5,011,800.

FIELD OF THE INVENTION

A reaction-sintering process for the preparation via metallothermic reduction and synthesis of one or more composites containing silicides.

BACKGROUND OF THE PRIOR ART

Silicides are compounds of silicon and transition metals. Among the best known silicides are those of molybdenum, titanium, niobium, tantalum, zirconium, uranium, hafnium, tungsten, and the like.

One very useful material is molybdenum disilicide. It is one of the very few commercially feasible materials used in high-temperature heating elements for oxidizing environments. Thus, e.g., U.S. Pat. No. 3,027,331 of Schrewelius discloses the preparation of electrical resistance heating elements from molybdenum disilicide.

One problem with molybdenum disilicide, and the other silicides, is that they are usually very expensive to produce. Thus, for example, in the conventional method for making molybdenum disilicide, molybdenum and silicon are heated at a temperature of from between about 1,400 to about 1,600 degrees centigrade for at least about 6 hours.

The materials used in the conventional method are very expensive. Thus, referring to the 1990-1991 Alfa Catalog (available from Alfa Products, Ward Hill, Mass.), molybdenum powder in the 3-7 micron particle size range (reagent number 10030) costs ninety-eight dollars per kilogram, and silicon powder with a particle size smaller than 325 mesh (reagent 12681) costs one-hundred thirty four dollars per kilogram. The molybdenum disilicide available from Alfa Products (reagent number 11549) costs four-hundred twelve dollars per kilogram.

In addition to being very expensive, the molybdenum disilicide material suffers from other disadvantages. Thus, as disclosed in U.S. Pat. No. 4,704,372 of Watanabe et al., a "... sintered body of MoSi$_2$ alone is low in strength and also extremely brittle at normal temperature . . . ." Furthermore, these molybdenum disilicide bodies have low creep resistance at elevated temperatures.

It is an object of this invention to provide a metallic silicide composition with improved mechanical properties.

It is another object of this invention to provide a metallic silicide composition with improved creep resistance.

It is yet another object of this invention to provide a metallic silicide composition with can be prepared in one step by reaction sintering.

It is yet another object of this invention to provide a relatively low cost process for the preparation of a metallic silicide composition.

It is yet another object of this invention to provide a relatively low cost process for the production of metallic silicide composites.

SUMMARY OF THE INVENTION

In accordance with this invention, there is provided a process in which a transition metal compound is mixed with silica until a specified density of intimate contact points is produced in the mixture. To this mixture is then added a reducing agent. Thereafter, a reinforcing agent is intimately dispersed throughout the mixture, the mixture is formed into a green body, and it then is ignited.

BRIEF DESCRIPTION OF THE DRAWING

The present invention will be more fully understood by reference to the following detailed description thereof, when read in conjunction with the attached drawing, wherein like reference numerals refer to like elements, and wherein.

DESCRIPTION OF THE PREFERRED EMBODIMENTS

Figure 1:
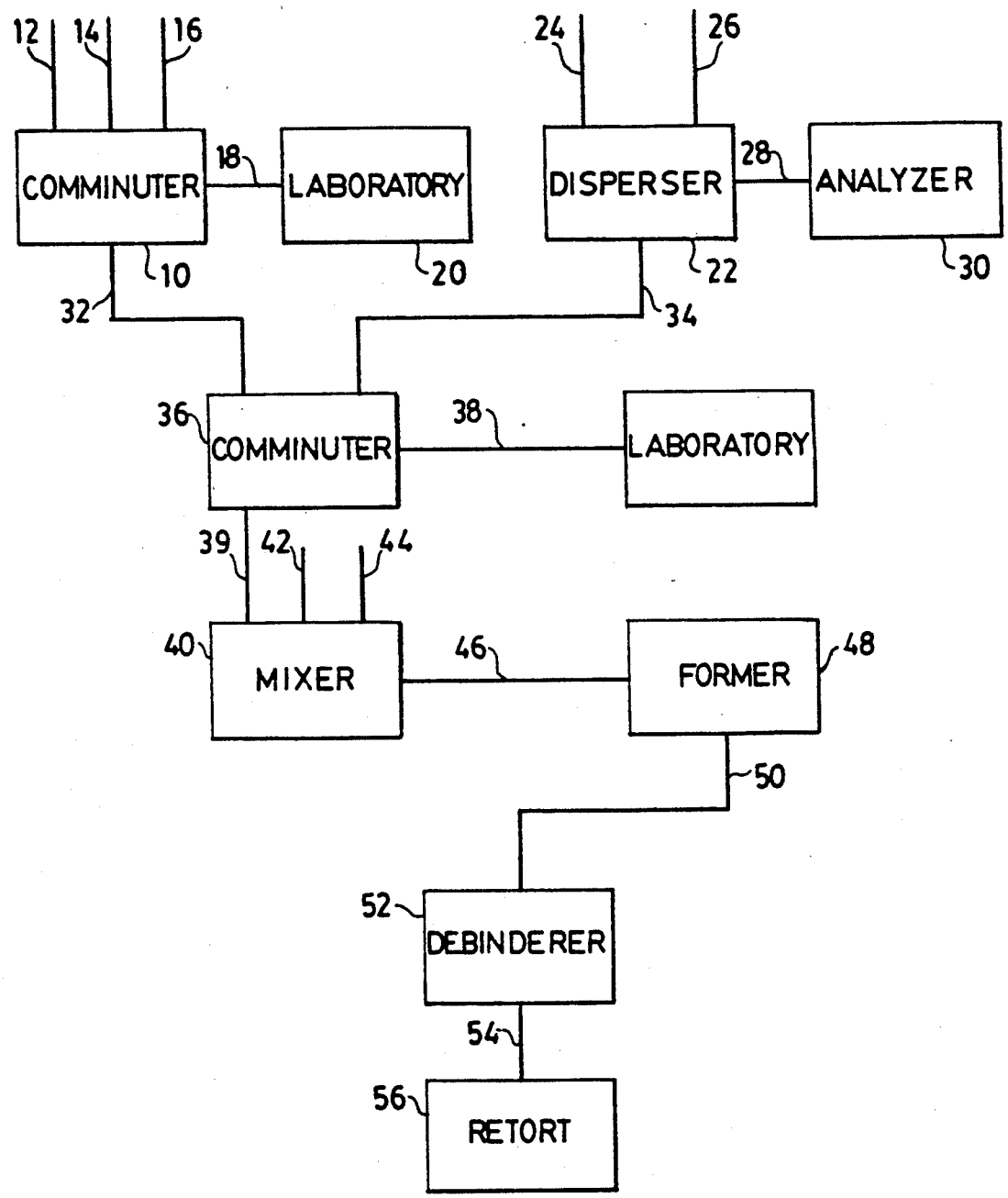
FIG. 1 is a flow chart illustrating a preferred process of this invention.

In the first step of the process of this invention, a transition metal compound is mixed with a silica.

Referring to FIG. 1, into comminuter 10 is charged a transition metal compound (via line 12), silica (via line 14), and surfactant (via line 16).

Comminuter 10 may be any comminution apparatus which is capable of imparting a high degree of energy by intensive mechanical treatment. Thus, comminuter 10 may be a high-speed rotary ball mill, a high-energy vibratory mill, an attrition mill, and the like. The function of comminuter 10 is to introduce a sufficient amount of mechanical energy into the materials so that they form at least a pseudo-mechanical alloy.

In one embodiment, comminuter 10 is a vibratory mill. Vibratory mills are described on pages 8-29 to 8-30 of Robert H. Perry and Cecil H. Chilton's "Chemical Engineers' Handbook," Fifth Edition (McGraw Hill Book Company, New York, 1973), the disclosure of which is hereby incorporated by reference into this specification. Thus, by way of illustration and not limitation, one may use a Sweco Vibratory Mill; suitable models include models M-18, M-45, M-60, and M-80; and the operation of these vibratory mills is described in a publication entitled "SWECO Vibro-Energy Grinding Mills," revised 1986 (Sweco, Inc., Florence, Ky., 1986), the disclosure of which is hereby incorporated by reference into this specification. Thus, e.g., one may use other vibratory mills such as, e.g., an Allis Chalmers vibratory mill, a Podmore-Boulton vibratory mill, and the like.

In one embodiment, comminuter 10 is a high-speed ball mill such as, e.g., a centrifugal ball mill. Thus, by way of illustration, one may use the centrifugal ball mills described in sections 7 and 10 of catalog R1, Brinkman Instruments Company, Cantiague Road, Westbury, N.Y. 11590 (printed in West Germany in August, 1986), the disclosure of which is hereby incorporated by reference into this specification.

To comminuter 10 is charged a compound of a transition metal via line 12. As is known to those skilled in the art, the transition metals include molybdenum, titanium, niobium, tantalum, zirconium, uranium, hafnium, cobalt, vanadium, tungsten, and the like.

It is preferred to use the oxide and/or the carbide and/or the boride of the transition metal. However, other compounds also may be used, such as the fluorides and/or the hydrides of the transition metals.

It is most preferred to use the oxides of the transition metals, for they are relatively inexpensive and generally are available as an as-mined product.

The metal compound charged via line 12 preferably has a particle size distribution such that substantially all of its particles are from about 0.1 to 10 microns in size. It is more preferred that substantially all of the particles of the metal compound be from between about 0.5 to about 5.0 microns in size. In the most preferred embodiment, the particles of the metal compound are between from about 1 to about 2 microns in size.

Referring again to FIG. 1, to line 14 is charged silica. It is preferred that the silica have a particle size distribution such that substantially all of its particles are smaller than about 5 microns. Thus, by way of illustration, one may use reagent 13024, "Silicon (IV) oxide," which has a purity of at least 99.5 percent and is available from Johnson Matthey (see the 1990-1991 Alfa catalog).

The silica and the transition metal compound are charged to comminuter 10 in stoichiometric ratio, based upon the ratio of the silicon and the transition metal in the silicide to be formed.

The silica in the system is reduced by the reducing agent to elemental silicon, as is illustrated by the following formula in which aluminum is the reducing agent:

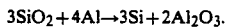
$$3SiO_2 + 4Al \rightarrow 3Si + 2Al_2O_3.$$

The transition compound metal in the system is also reduced by the reducing agent to its corresponding elemental metal, as is also illustrated by the following formula in which aluminum is the reducing agent and molybdenum oxide is the transition metal compound:

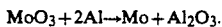
$$MoO_3 + 2Al \rightarrow Mo + Al_2O_3.$$

Thus, in this example, one must charge 6 moles of silica and three moles of molybdenum oxide to produce sufficient elemental silicon and molybdenum to form the desired molybdenum disilicide with the formula $MoSi_2$.

It will be readily apparent to those skilled in the art that, as the chemical identity of the desired silicide and/or the transition metal compound and/or the reducing agent changes, the stoichiometry of the reactions change. Thus, the stoichiometry of some typical reactions is presented below.

If one desires to prepare a composite containing one mole of titanium disilicide ($TiSi_2$) and 2 moles of alumina, one may react 2 moles of silica (39.0 parts by weight) with 1 mole of titania (26.0 parts by weight) and 4 moles of aluminum (35.0 parts by weight).

If one desires to prepare a composite containing 6 moles of titanium disilicide ($TiSi_2$) and eleven moles of alumina, one may react 12 moles of silica (41.3 parts by weight) with 3 moles of titanium trioxide (24.7 parts by weight) and 22 moles of aluminum (34.0 parts by weight).

If one desires to prepare a composite containing 3 moles of titanium trisilicide ($Ti_5Si_3$) and 16 moles of alumina, one may react 9 moles of silica (20.8 parts by weight) with 15 moles of titania (46.0 parts by weight) and 32 moles of aluminum (33.2 parts by weight).

If one desires to prepare a composite containing 2 moles of titanium trisilicide and 9 moles of alumina, one may react 6 moles of silica (23.0 parts by weight) with 5 moles of titanium trioxide (45.9 parts by weight) and 18 moles of aluminum (31.1 parts by weight).

If one desires to produce a composite containing 3 moles of zirconium silicide ($Zr_2Si$) and 6 moles of alumina, one may react 3 moles of silica (14.5 parts by weight) with 6 moles of zirconia (59.5 parts by weight) and 12 moles of aluminum (26.0 parts by weight).

If one desires to produce a composite containing 3 moles of zirconium trisilicide ($Zr_5Si_3$) and 16 moles of alumina, one may react 9 moles of silica (16.6 parts by weight) with 15 moles of zirconia (56.8 parts by weight) and 32 moles of aluminum (26.6 parts by weight).

If one desires to produce a composite containing 3 moles of zirconium silicide (ZrSi) and 4 moles of alumina, one may react 3 moles of silica (23.5 parts by weight) with 3 moles of zirconia (48.3 parts by weight) and 8 moles of aluminum (28.2 parts by weight).

If one desires to produce a composite containing 3 moles of zirconium disilicide ($ZrSi_2$) and 6 moles of alumina, one may react 6 moles of silica (34.2 parts by weight) with 3 moles of zirconia (35.1 parts by weight) and 12 moles of aluminum (29.7 parts by weight).

If one desires to produce a composite containing 3 moles of hafnium disilicide ($HfSi_2$) and 6 moles of alumina, one may react 6 moles of silica (27.4 parts by weight) with 3 moles of hafnium dioxide (48.0 parts by weight) and 12 moles of aluminum (24.6 parts by weight).

If one desires to produce a composite containing 6 moles of vanadium silicide ($V_3Si$) and 19 moles of alumina, one may react 6 moles of silica (11.9 parts by weight) with 9 moles of vanadium pentoxide (54.1 parts by weight) and 38 moles of aluminum (34.0 parts by weight).

If one desires to produce a composite containing 6 moles of vanadium trisilicide ($V_5Si_3$) and 37 moles of alumina, one may react 18 moles of silica (18.6 parts by weight) with 15 moles of vanadium pentoxide (47.0 parts by weight) and 74 moles of aluminum (34.4 parts by weight).

If one desires to produce a composite containing 6 moles of vanadium disilicide ($VSi_2$) and 13 moles of alumina, one may react 12 moles of silica (36.6 parts by weight), 3 moles of vanadium pentoxide (27.7 parts by weight), and 26 moles of aluminum (35.7 parts by weight).

If one desires to produce a composite containing 6 moles of niobium disilicide ($NbSi_2$) and 13 moles of alumina, one may react 12 moles of silica (32.5 parts by weight), 3 moles of niobium pentoxide (35.9 parts by weight), and 26 moles of aluminum (31.6 parts by weight).

If one desires to produce a composite containing 6 moles of tantalum trisilicide ($Ta_5Si_3$) and 37 moles of alumina, one may react 18 moles of silica (11.1 parts by weight), 15 moles of tantalum pentoxide (68.3 parts by weight), and 74 moles of aluminum (20.6 parts by weight).

If one desires to produce a composite containing 6 moles of tantalum disilicide ($TaSi_2$) and 13 moles of alumina, one may react 12 moles of silica (26.2 parts by weight), 3 moles of tantalum pentoxide (48.2 parts by weight), and 26 moles of aluminum (25.6 parts by weight).

If one desires to make a composite containing 1 mole of molybdenum trisilicide ($Mo_5Si_3$) and 7 moles of alumina, one may react 3 moles of silica (14.1 parts by weight), 5 moles of molybdenum trioxide(56.3 parts by weight), and 14 moles of aluminum (29.6 parts by weight).

If one desires to produce a composite containing 3 moles of molybdenum disilicide ($MoSi_2$) and 7 moles of alumina, one may react 6 moles of silica (30.8 parts by weight), 3 moles of molybdenum trioxide (36.9 parts by weight), and 14 moles of aluminum (32.3 parts by weight).

If one desires to produce a composite containing 3 moles of tungsten disilicide ($WSi_2$) and 7 moles of alumina, one may react 6 moles of silica (25.1 parts by weight), 3 moles of tungsten trioxide (48.5 parts by weight), and 14 moles of aluminum (26.4 parts by weight).

The aforementioned is merely illustrative. Thus, as will be recognized by those skilled in the art, when other reducing agent(s) is used, the stoichiometry may change.

In the preferred embodiment, where aluminum is used as the reducing agent, it is preferred to use from about 10 to about 45 parts (by weight) of silica, from about 20 to about 70 parts (by weight) of metal oxide, and from about 20 to about 40 parts (by weight) of aluminum.

One may, but need not, charge a surfactant via line 16 to the comminuter 10. As used in this specification, the term "surfactant" refers to a surface active agent, that is, a material that modifies energy relationships at interfaces. It is preferred that, if a surfactant is used, it be an organic compound which is liquid and which is preferably nonionic. Suitable nonionic surfactants are described in U.S. Pat. No. 4,477,259, the disclosure of which is hereby incorporated by reference into this specification.

In one preferred embodiment, the surfactant is a carboxylic acid of the formulae R—COOH, wherein R is selected from the group consisting of alkyl containing from about 10 to about 20 carbon and alkylene containing from about 10 to about 20 carbon atoms. Thus, some suitable surfactants include stearic acid, oleic acid, caprylic acid, capric acid, lauric acid, myristic acid, palmitic acid, linoleic acid, erucic acid, brasidic acid, elaidic acid, stearolic acid, and mixtures thereof.

In general, from about 0.5 to about 1.0 percent, of surfactant, by combined weight of the metal compound and silica, may be charged via line 16.

The compound of the transition metal and the silica are comminuted in comminuter 10 until a single phase composition is produced. As used in this specification, the term "phase" refers to a separate, but homogeneous, fraction of a system. The use of a scanning electron microscope to determine the number of phases in a ceramic material is well known to those skilled in the art. See, e.g., pages 443-456 of Volume 8 of the "McGraw-Hill Encyclopedia of Science & Technology" (McGraw-Hill Book Company, New York, 1977); C.W. Oatley, W.C. Nixon, and R.F.W. Pease, "Scanning electron microscopy, Advances in Electronics and Electron Physics," vol. 21, 1965; and pages 132-136 of J.T. Jones and M.F. Berard's "Ceramics: Industrial Processing and Testing," (The Iowa State University Press, Ames, Iowa, 1972). The disclosure of each of these documents is hereby incorporated by reference into this specification.

During the comminution of the transition metal compound and the silica, samples of the reaction mixture may be withdrawn via line 18 to laboratory 20 to determine whether a single phase composition has been produced.

When one uses either a high-speed ball mill or a vibratory mill in the process of this invention, a specified grinding media should be used. In the first place, the grinding media should have a density at least about 6.0 grams per cubic centimeter. Thus, e.g., one may use zirconia media, stainless steel media, tungsten carbide media, and the like.

When a high-speed ball is used, the weight/weight ratio of grinding media/material to be ground should be at least about 6/1. With a vibratory ball mill, said weight/weight ratio should be at least about 8/1. The volume/volume ratio of the grinding media/material to be ground preferably should be no more than about 3/1 in the ball mill and no more than about 4/1 in the vibratory mill.

The reaction mixture in comminuter 10 is comminuted until analysis reveals that it is comprised of substantially a single phase material, as shown by scanning electron microscopy. A sample of the reaction mixture in comminuter 10 may be periodically removed via line 18 to laboratory 20 wherein it may be subjected to analysis by a scanning electron microscope to determine whether it consists essentially of only one phase. Single phase compositions were discussed in applicant's Ph.D. thesis entitled "Study of Solid-State Aluminothermal Reactions: Influence of Activation and Moderation Processes," which was submitted to the Senate of the Technion—Israel Institute of Technology in Haifa, Israel in February of 1987, and which was published in April of 1987. By way of illustration, FIGS. 5-11 to 5-13 of such thesis (at page 79) illustrate substantially single phase compositions.

In another part of applicant's process, a reducing agent is charged via line 24 to disperser 22. As indicated above, the amount of reducing agent utilized will depend upon the stoichiometry of the reducing reactions. A dispersing agent is also preferably added via line 26 to disperser 22.

One should use a metal powder as the reducing agent. The particle size distribution of such metal powder is such that substantially all of its particles are smaller than 10 microns.

The metal powder used is preferably selected from the group consisting of lanthanum, calcium, magnesium, lithium, strontium, aluminum, barium, and mixtures thereof. One must choose a metal reducing agent which has a heat of formation of its oxide which is greater than the heat of formation of either the silica (101.7 kilocalories) and the transition metal compound charged via line 12. As is known to those skilled in the art, the heat of formation of the oxides of the aforementioned metals, expressed in kilocalories released when 15.9994 grams of oxygen combine with an equivalent of the reducing agent to form the highest oxide, are: 153.3 (lanthanum oxide), 151.7 (calcia), 143.8 (magnesia), 142.3 (lithia), 140.7 (strontia), 133.0 (alumina), and 133.0 (baria).

In addition to the metal powder charged via line 24, it is preferred to add a coating/dispersing agent via line 26. In one embodiment, the coating/dispersing agent is a silicone. It is preferred to add from about 0.5 to about 1.0 weight percent of said silicone (by total weight of the reducing agent) to the mixture.

As is known to those skilled in the art, silicones (organosiloxanes) are a group of siloxane polymers based on a structure consisting of alternate silicon and oxygen atoms with various organic radicals. See, e.g., pages 1039–1040 of N. Sax's "Hawley's Condensed Chemical Dictionary," Eleventh Edition (Van Nostrand Reinhold Company, New York, 1987), the disclosure of which is hereby incorporated by reference into this specification.

In one preferred embodiment, the coating/dispersing agent is a silicone fluid, which is a linear chain of polydimethyl siloxane. As is known to those skilled in the art, the molecular weights of these fluids will determine their viscosity. Furthermore, the properties may further be modified by replacing the pendant methyl groups by phenyl and/or trifluoropropyl and/or by other groups. See, e.g., pages 152–154 of the "Modern Plastics Encyclopedia" (Modern Plastics, Mid-October Encyclopedia Edition, Volume 67, Number 11 (McGraw Hill, Highstown, N.J.).

The reducing agent and the coating/dispersing agent may be mixed until the average particle size is less than about 5 microns. Samples of the mixture in disperser 22 may periodically be withdrawn via line 28 to analyzer 30 in which the particle size distribution of the mixture may be determined. One may use any of the particle size analyzers known to those skilled in the art as analyzer 30. Thus, by way of illustration, one may use the Brinkman Model 2010 Particle Size Analyzer (available from Brinkman Instruments Inc., Cantiague Road, Westbury, N.Y.).

In one preferred embodiment, the mixing which occurs in disperser 22 is done under inert atmosphere. The term inert atmosphere refers to an atmosphere which will prevent the reaction mixture from being contacted by oxygen or oxygen-containing gas and, furthermore, will not react with any of the components of the reaction mixture. Suitable inert atmospheres for the reducing agent and/or the coating/dispersing agent include argon, krypton, and the like.

The single phase composition produced in comminuter 10 and the coated reducing agent produced in disperser 22 are fed via lines 32 and 34, respectively, to comminuter 36. This comminuter 36 is similar to the comminuter 10; and the comminution in comminuter 36 takes place until a substantially single-phase composition is produced. During the mixing, samples of the reaction mixture may be withdrawn via line 38 to laboratory 40, wherein analysis is conducted to determine whether a single phase composition has been produced.

The single phase comminuted material from comminuter 36 is then passed via line 38 to mixer 40, wherein it is mixed with reinforcing agent until a substantially homogeneous mixture is obtained. Any of the mixers well known to those skilled in the art may be used as mixer 40. Thus, for example, one may use a cone blender. One such suitable cone blender is the 24-inch diameter Rota-Cone blender manufactured by the Paul O. Abbe, Inc. of 139 Center Avenue, Little Falls, N.J.

From about 0 to about 80 weight percent (by weight of the mixture of reinforcing agent and comminuted material) of reinforcing agent is added to mixer 40 via line 42. In one preferred embodiment, from about 5 to about 80 weight percent of reinforcing agent is used. Any inorganic filler which is chemically different from the comminuted material, is inert under the conditions of use, and serves to occupy space, may be used. The reinforcing agent may be added in the form of whiskers and/or powder and/or short fibers.

The term whisker, as used in this specification, refers to a needle-like single crystal of metallic and nonmetallic compounds with an aspect ratio of at least about 10. See, e.g., U.S. Pat. No. 4,948,761, the disclosure of which is hereby incorporated by reference into this specification.

The reinforcing agent may be a short fiber and/or a chopped fiber, i.e., a polycrystalline material of less than about 300 microns length and with an aspect ratio of at least about 50.

It is preferred that the reinforcing agent be a refractory oxide or nonoxide material selected from the group consisting of graphite, boron, and the oxides, carbides, borides, nitrides, and silicides of silicon, boron, titanium, chromium, tantalum, manganese, magnesium, molybdenum, vanadium, niobium, hafnium, aluminum, tungsten, zirconium, aluminum, and the like.

In one preferred embodiment, the reinforcing agent is alumina powder and/or alumina fiber and/or mixtures thereof.

In another preferred embodiment, the reinforcing agent is silicon carbide powder and/or silicon carbide whisker and/or mixtures thereof.

In another embodiment, the reinforcing agent is selected from the group consisting of the fibers and/or powders of titanium diboride, titanium carbide, titanium nitride, and mixtures thereof.

In yet another embodiment, the reinforcing agent is a mixture of two or more of the aforementioned agents. Thus, e.g., one may use a mixture of titanium carbide powder and/or whiskers and alumina powder and/or whiskers. Thus, one may use a mixture of silicon carbide powder and/or whiskers and alumina powder and/or whiskers.

In one embodiment, from about 0 to about 25 weight percent of one or more green body additives are added to mixer 40 via line 44. As is well known to those skilled in the art, such green body additives may be dispersants, binders, lubricants, and the like.

The mixture in mixer 40 is mixed until a substantially homogeneous material is produced. Thereafter, the mixture thus produced is passed via line 46 to former 48, wherein a green body is produced.

The material made in mixer 40 may be used to prepare a green body. Such material may be formed into a green body by any conventional technique, such as pressing. It is preferred that the green body contain from about 75 to about 92 weight percent of said composition.

The green body preferably contains at least one material selected from the group consisting of binders, lubricants, and mixtures thereof. Typical binders and lubricants which may be used include unsaturated fatty acids (such as, e.g., stearic or oleic acid), organic materials, starches, gums, waxes, dextrine, corn flower, polyvinyl alcohol, marine derivatives, lignin extracts, methyl cellulose, and the like. It is preferred that the binder and/or lubricant used burn out of the ceramic body at temperatures below 500 degrees centigrade so that they will not interfere with combustion-synthesis reactions which occur at higher temperatures.

When a binder is used, it preferably is organic. Preferred organic binders include natural gums (such as xanthan gum, gum arabic, and the like), polysaccharides (such as refined starch, dextrine, and the like), lignin extracts (such as paper liquor), refined alginate (such as sodium or ammonium alginate), cellulose ethers (such as methyl cellulose, hydroxyethyl cellulose, sodium carboxymethyl cellulose, and the like), polymerized alcohols (such as polyvinyl alcohol), other vinyl binders (such as polyvinyl acetate, polyacrylamide, polyvinyl pyrolidone, and the like), polymerized butyral (such as polyvinyl butyral), acrylic resins (such as polymethyl methacrylate), glycols (such as polyethylene glycol), waxes (such as paraffin, bee's wax, wax emulsions, microcrystalline wax, and the like), and the like.

One preferred class of binders are the vinyl binders. These binders are preferably selected from the group consisting of polyvinyl acetate, polyvinyl alcohol, polacrylamide, polvinyl pyrolidone, and mixtures thereof.

In one preferred embodiment, the aforementioned composition is ground until at least about 95 weight percent of its particles are smaller than about 53 microns, and from about 75 to about 92 weight parts of the ground material is mixed with from about 25 to about 8 parts of polyvinyl alcohol. In this embodiment, the polyvinyl alcohol is preferably in the form of a non-aqueous solution containing less than about 20 weight percent of the active ingredient (polyvinyl alcohol) and non-aqueous media.

Another preferred class of binders are the waxes. Common waxes used as film-type binders are paraffin derived from petroleum, candelella and carnuba waxes derived from plants, and beeswax of insect origin. Paraffins are mixtures of straight-chain saturated hydrocarbons which tend to crystallize as plates or needles. Microcrystalline waxes are branched chain saturated hydrocarbons also derived from petroleum. The plant waxes are more complex mixtures of straight chain hydrocarbons, esters, acids, and alcohols that are relatively hard and have a relatively hard melting point of 85–90 degrees centigrade.

In one embodiment, at least one of the additives used in the green body is a lubricant. As is known to those skilled in the art, lubricants are materials which facilitate the flow of nonplastic, or poorly plastic, materials in the formation of dense compacts; and they are especially useful in dry pressing.

By way of illustration and not limitation, typical lubricants which may be used in the green body include kerosene, lard oil (also known as die oil), graphite, talc, clay, mica, number 4 fuel oil, stearic acid, stearates, dispersed stearates, cetyl alcohol, camphor, mineral oils, starches, alginates, polyvinyl alcohol, polyvinyl acetate, wax emulsions, solid waxes, methyl cellulose, and the like.

Forming a Green Body by Injection Molding

In one preferred embodiment, a green body is formed by an injection molding process. In this process, it is preferred to mix from about 75 to about 92 parts of applicant's composition, with a particle size such at least about 95 percent of its particles are smaller than 53 microns, with from about 25 to about 8 parts of thermoplastic binder.

The injection molding process is well known to those skilled in the art and is described, e.g., on pages 590 to 592 of Brage Golding's "Polymers and Resins" (D. Van Nostrand Company, Inc., Princeton, N.J., 1959), the disclosure of which is hereby incorporated by reference into this specification. Injection molding of ceramic materials is described on pages 373 to 377 of James S. Reed's "Introduction to the Principles of Ceramic Processing" (John Wiley & Sons, New York, 1988), the disclosure of which is also hereby incorporated by reference into this specification.

In this embodiment, in addition to using thermoplastic binder, one may also mix applicant's composition with a surfactant such as, e.g., oleic acid. In general, from about 75 to about 92 percent of the composition is dispersed in from about 8 to about 25 percent of the binder. Thereafter, the mixture is injection molded into a green body at a preferred pressure of from about 4 to about 8 atmospheres.

Forming a Green Body by Other Means

Applicant's composition may be mixed with one or more of said binders and/or lubricants and formed into green bodies by conventional means. Thus, by way of illustration, one may use a single-action press to compact the mixture at a pressure of from between about 35 to about 200 megaPascals, one may use hot pressing, one may use isostatic pressing, and one may use any of the conventional means known to those skilled in the ceramic art for forming green bodies from powder mixtures.

In one preferred embodiment, the binder used in the mixture to be pressed is a polyvinyl alcohol non-aqueous solution which contains no more than about 20 percent, by weight of solution, of polyvinyl alcohol. From about 8 to about 25 parts, by weight, of this solution are preferably mixed with from about 75 to about 82 parts of applicant's composition, preferably with a composition which contains particles at least about 95 percent of which are smaller than 53 microns.

Debindering the Green Body

After the green body comprised of applicant's composition has been formed, it is preferred to subject it to conditions to insure that it has substantially no moisture and substantially no organic matter in it prior to the time it subjected to reaction-sintering.

The green body will be debindered by heating it to a temperature of from about 60 to about 500 degrees centigrade, preferably for from about 1 to about 5 hours.

As is known to those skilled in the art, the temperature and time required for drying will vary with conditions such as, e.g., the thickness of the green body, the humidity, the air velocity, etc. By way of illustration, in one preferred embodiment, in which the green body contains about 8 parts by weight of a 5.0 percent solution of polyvinyl alcohol, the green body is dried at the rate of from about 0.5 inch per hour by being subjected to a temperature of from about 105 to about 250 degrees centigrade.

It is also preferred prior to reaction-sintering to remove substantially all of the organic material in the green body so that it contains less than about 1.0 weight percent of such organic matter. Thus, referring again to FIG. 1, the green body may be passed from former 48 via line 50 to debinderer 52, in which it is debindered by conventional means. This debindering can be accomplished by heating the green body until the organic matter in it is burned out. As is known to those skilled in the art, the debindering conditions will vary with factors such as the type(s) and concentration(s) of the organic material in the green body, the thickness of the green body, etc. By way of illustration, in one embodiment in which the green body contains about 8 weight percent of an organic binder, the green body is heated over a period of from about 8 to about 24 hours, in various steps, to temperatures of 60–105, 105–180, 180–250, 250–400, and 400–500 degrees centigrade.

It is often required to heat the green body to a temperature of at least about 500 degrees centigrade to burn out the hydrocarbon matter in it.

After the green body has been debindered, it is passed via line 54 to retort 56, in which it is subjected to reaction sintering.

Reaction Sintering of the Debindered Green Body

The debindered green body may be ignited, and be caused to undergo reaction-sintering, by being subjected to a suitable source of heat. In general, the debindered green body should be heated to a temperature in excess of about 600 degrees Centigrade to cause such ignition.

The debindered green body may be heated to the desired ignition temperature by any of several means. In one embodiment, not shown, the body is placed in a furnace, blanketed with protective atmosphere (such as argon, hydrogen, a mixture of argon and hydrogen, etc.) and then heated to a temperature of at least about 600 degrees Centigrade.

The function of the protective atmosphere is to shield the debindered green body from oxygen and/or nitrogen. Thus, the hydrogen acts as a protective atmosphere by reacting with the oxygen which either is in the atmosphere or is generated by the reaction-sintering; other gases (such as, e.g., carbon monoxide) which function in the same manner also may be used.

When a mixture of the inert gas (such as argon) and the oxygen-catching gas (such as hydrogen) is used, it is preferred to use at least about 50 volume percent of the inert gas and, preferably, at least about 75 volume percent of the inert gas.

Once the debindered green body has been placed into the furnace and blanketed with one or more protective gases, it is preferred to raise the temperature from ambient to a temperature which is at least about 100 degrees Centigrade in excess of the temperature at which ignition occurs at a rate of from about 10 to about 30 degrees Centigrade per minute.

The ignition temperature of the debindered green body may be determined by means of differential thermal analysis ("DTA"). As is known to those skilled in the art, in differential thermal analysis thermocouples in contact with a specimen and a reference material indicate the test temperature and any differential temperature due to an endothermic or exothermic transition or reaction in the sample as a function of temperature or time (see, e.g., page 77 of the aforementioned James S. Reed book).

In performing the DTA analysis, a sample of the debindered green body is subjected to evaluation while under the protective atmosphere which will be used in the reaction-sintering.

In one preferred embodiment, the debindered green body is first placed into a graphite retort 56 prior to the time it is heated in a furnace. In one aspect of this embodiment, the debindered green body is placed into the retort without any packing material surrounding it. In another aspect of this embodiment, the debindered green body is placed in the retort and packed with inert powder. As used in this specification, the term inert powder refers to powder which will not enter into any of the reaction-sintering reactions with any of the chemical species which are either in the debindered-green body and/or are generated during the reaction-sintering.

Some suitable inert packing powders which may be used include, e.g., metal oxides such as alumina, magnesia, zirconia, and the like; graphite and/or carbon powder; carbides, such as silicon carbide, titanium carbide, tungsten carbide, and the like; mixtures of the above; and the like.

In one embodiment, the packing powder used functions as a source of heat to ignite the debindered green body. In this embodiment, thermite-type powder mixtures may be used; and, after they are ignited, they in turn generate sufficient heat to ignite the debindered green body.

A thermite powder mixture which, upon ignition, generates a temperature which is at least about 100 degrees centigrade higher than the ignition temperature of the debindered green body, may be used. However, the thermite powder should be such that, after its ignition, it does not produce a liquid phase.

Those skilled in the art are well aware of the identify of those thermite powders which, after ignition, produce only solid phases. Thus, by way of illustration and not limitation, one may use a mixture of silicon dioxide and aluminum, a mixture of titania and aluminum, a mixture of zirconia and aluminum, a mixture of tungsten oxide and aluminum, and the like. As will be evident to those skilled in the art, one may also use other metal oxides (such as, e.g., the transition metal oxides) and/or other elemental reducing agents (such as lanthanum, barium, silicon, and the like).

In one preferred embodiment, the thermite powder is a mixture of silica and aluminum, in stoichiometric ratio.

When a thermite packing powder is used, it may be ignited by suitable means such as a hot wire, a laser beam, etc.

It is preferred to place the retort containing the debindered green body packed in the packing powder into a furnace which is blanketed with the aforementioned protective atmosphere prior to the time the body is ignited. After being so placed into the furnace and covered with the atmosphere, the heat source (either the furnace, or the thermite mixture, or both) is then applied to the body to ignite it.

Once the debindered green body has been ignited, it undergoes a self-propagating reaction which causes it to synthesize the silicide and to sinter the body. The reacted material thus formed is comprised of silicide, metal oxide, and, optionally, reinforcing agent(s). In general, the porosity of the sintered body thus produced will be less than about 15 percent and, preferably, from about 6 to about 12 percent.

The following examples are presented to illustrate the claimed invention but are not to be deemed limitative thereof. Unless otherwise specified, all parts are by weight, and all temperatures are in degrees centigrade.

EXAMPLES

Example 1

29.88 grams of molybdenum oxide (reagent number 11837A, Johnson Mathey Alfa Products, Ward Hill, Mass.) were mixed with 24.94 grams of silica (catalog number IMSIL A-108, Illinois Minerals Company, Cairo, Ill.) in a mortar with a pestle for 5 minutes. The mixture was then introduced into a tungsten carbide jar together with tungsten carbide grinding media, in a material/media weight/weight ratio of 1/6. The jar was then placed in a Brinkman centrifugal ball mill (Centrifugal Ball Mill S-1, Brinkman Instruments Company, Cantiague Road, Westbury, N.Y.) and comminuted at 540 revolutions per minute for about 3 hours.

30.18 grams of aluminum powder (grade 1401T, Aluminum Company of America) were mixed with 0.2 grams of polydimethylsiloxane silicone fluid (grade 200, Dow Corning Corporation, Midland, Mich.) in a mortar with a pestle for 5 minutes. This mixture was then added to the jar containing the comminuted silica and molybdenum oxide. The jar was covered with an aluminum lid equipped with openings allowing the introduction and removal of argon gas during comminution. Thereafter, the mixture in the jar was comminuted at 540 revolutions per minute for 2 hours while being blanketed with argon gas.

The comminuted material thus produced was then mixed in a porcelain capsule with 15 grams of alumina fiber (Safil Alumina fiber grade HA milled, Type 64, supplied by ICI Americas, Inc., Wilmington, Del.) for about 20 minutes. The mixture thus produced was then compacted into pellets with a diameter of about 1.0 inch and a thickness of about 0.5 inch using a Carver laboratory press (model number 13-872, see page 897 of the Fischer '88 catalog, Fischer Scientific Company) at a pressure of about 5,000 pounds per square inch.

One of the pellets thus produced was packed in graphite powder, and the pellet thus packed was placed in a graphite retort. The graphite retort was then placed in a graphite cartridge in a graphite element furnace (available as model number 1000-45120-FP30 from Thermal Technology Inc., Astro Division, of Santa Barbara, Calif.). The furnace door was closed, and the furnace chamber was blanketed with a mixture of 25 volume percent of hydrogen and 75 volume percent of argon at 2 pounds per square inch of pressure. The furnace was then heated up to a temperature of 800 degrees Centigrade at a rate of 20 degrees per minute, and it was maintained at this temperature for 30 minutes. Thereafter, it was cooled to ambient over a period of about 90 minutes.

The reacted pellet was then unloaded from the packing powder. It presented as a slightly shrunken pellet with a porosity of about 12 percent. X-ray analysis indicated that substantially all of the material in the pellet was a mixture of molybdenum disilicide and alumina. A trace amount of molybdenum trisilicide was present, but there were no traces of silica, molybdenum oxide, or aluminum present.

EXAMPLE 2

The procedure of Example was substantially followed, with the exception that 14.06 grams of molybdenum oxide, 11.74 grams of silica, 14.2 grams of aluminum, and 60 grams of alumina powder were used. The porosity of the reacted pellet was 8.0%. No trace of molybdenum trisilicide was present in the reacted pellet.

EXAMPLE 3

The procedure of Example 1 was substantially followed, with the exception that 21.09 grams of molybdenum oxide, 17.6 grams of silica, 21.3 grams of aluminum, and 40 grams of silicon carbide whiskers (obtained from Tokai Carbon America) were used. The reacted pellet contained no traces of molybdenum trisilicide. The porosity of the reacted pellet was about 14 percent.

EXAMPLE 4

The procedure of Example 3 was substantially followed, with the exception that 40 grams of a composite material containing 35 weight percent of silicon carbide whiskers and 65 weight percent of alumina was used as the reinforcing agent. (which was made in accordance with the procedure of U.S. Pat. No. 5,006,290) was used; the composite material contained 35 weight percent of silicon carbide whisker material and 65 weight percent of alumina. The reacted pellet had a porosity of 10 percent, and it contained no traces of molybdenum trisilicide.

EXAMPLE 5

The procedure of Example 4 was substantially repeated with the exception that the packing powder used was a thermite mixture containing 62.5 weight percent of silica and 37.5 weight percent of aluminum, the cartridge was blanketed only with argon, and it was ignited outside of the furnace environment with a silicon carbide igniter. The ignited pellet contained traces of silica and molybdenum trisilicide, it had a porosity of 12 percent, but no cracks or voids were observed in the product.

I claim:

1. A process for preparing a composite material comprised of a transition metal silicide and a metal oxide, comprising the steps of:
   (a) providing a powder mixture comprising silica and a compound of a transition metal, wherein:
      1. said transition metal is selected from the group consisting of molybdenum, titanium, niobium, tantalum, zirconium, uranium, hafnium, cobalt, vanadium, tungsten, and mixtures thereof;
      2. said compound is selected from the group consisting of the oxides, carbides, borides, fluorides, and hydrides of said transition metal;
      3. said transition metal compound has a particle size distribution such that substantially all of its particles are form about 0.1 to about 10 microns in size;
      4. said silica has a particle size distribution such that substantially all of its particles are smaller than 5 microns in size;
   (b) comminuting said mixture until a first, substantially single-phase composition is produced;
   (c) adding a reducing agent and from about 0.5 to about 1.0 weight percent, based on the weight reducing agent, of an organosiloxane to said single-phase composition, wherein said reducing agent is a metal powder substantially all of whose particles are smaller than about 10 microns;
   (d) comminuting said mixture of said reducing agent, said organosiloxane, and said first single-phase composition until a second, substantially single-phase composition is produced;
   (e) preparing a mixture by mixing said second, substantially single-phase composition with from about 5 to about 80 weight percent, based on the total weight of the mixture, of reinforcing agent;
   (f) forming said mixture of reinforcing agent and said second, substantially single-phase composition into a green body;
   (g) blanketing said green body with a protective atmosphere; and
   (h) igniting said green body.

2. The process as recited in claim 1, wherein said compound of said transition metal is a transition metal oxide.

3. The process as recited in claim 2, wherein said metal powder is a selected from the group consisting of lanthanum powder, calcium powder, magnesium powder, lithium powder, strontium powder, aluminum powder, barium, powder, and mixtures thereof.

4. The process as recited in claim 3, wherein said metal powder is aluminum powder.

5. The process as recited in claim 4, wherein said composite material is prepared from about 10 parts to about 45 parts by weight silica, from about 20 parts to about 70 parts by weight transition metal oxide, and from about 20 parts to about 40 parts by weight of aluminum.

6. The process as recited in claim 5, wherein said composite material is prepared from 2 moles of silica, one mole of titania, and 4 moles of aluminum.

7. The process as recited in claim 5, wherein said composite material is prepared from of 12 moles of silica, 3 moles of titanium trioxide, and 22 moles of aluminum.

8. The process as recited in claim 5, wherein said composite material is prepared from of 9 moles of silica, 15 moles of titania, and 32 moles of aluminum.

9. The process as recited in claim 5, wherein said composite material is prepared from of 6 moles of silica, 5 moles of titanium trioxide, and 18 moles of aluminum.

10. The process as recited in claim 5, wherein said composite material is prepared from of 3 moles of silica, 6 moles of zirconia, and 12 moles of aluminum.

11. The process as recited in claim 5, wherein said composite material is prepared from of 9 moles of silica, 15 moles of zirconia, and 32 moles of aluminum.

12. The process as recited in claim 5, wherein said composite material is prepared from of 3 moles of silica, 3 moles of zirconia, and 8 moles of aluminum.

13. The process as recited in claim 5, wherein said composite material is prepared from of 6 moles of silica, 3 moles of zirconia, and 12 moles of aluminum.

14. The process as recited in claim 5, wherein said composite material is prepared from of 6 moles of silica, 3 moles of hafnium dioxide, and 12 moles of aluminum.

15. The process as recited in claim 5, wherein said composite material is prepared from of 6 moles of silica, 9 moles of vanadium pentoxide, and 38 moles of aluminum.

16. The process as recited in claim 5, wherein said composite material is prepared from of silica, molybdenum trioxide, and aluminum.

17. The process as recited in claim 16, wherein, prior to the time said green body is ignited, it is packed in inert powder; and wherein said protective atmosphere is selected from the group consisting of argon, hydrogen, and mixtures thereof.

18. The process as recited in claim 19 wherein, prior to the time said green body is ignited, it is packed in thermite powder; and wherein said protective atmosphere is selected from the group consisting of argon, hydrogen, and mixtures thereof.

* * * * *